United States Patent
Shepherd et al.

(10) Patent No.: US 7,460,135 B2
(45) Date of Patent: Dec. 2, 2008

(54) TWO DIMENSIONAL ROTATION OF SUB-SAMPLED COLOR SPACE IMAGES

(75) Inventors: Thomas Joseph Shepherd, McKinney, TX (US); Donald Richard Tillery, Jr., Murphy, TX (US); Nishanth Rajan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 11/400,864

(22) Filed: Apr. 10, 2006

(65) Prior Publication Data

US 2007/0236608 A1 Oct. 11, 2007

(51) Int. Cl.
*G09G 5/00* (2006.01)
*H04N 9/74* (2006.01)
*G06T 3/00* (2006.01)
*G06T 3/60* (2006.01)
*G06K 9/00* (2006.01)
*G06K 9/46* (2006.01)

(52) U.S. Cl. .................... 345/656; 345/657; 345/565; 345/589; 345/649; 382/162; 382/296; 382/305; 348/557; 348/583; 348/567

(58) Field of Classification Search ................. 345/418, 345/581, 589, 649, 619, 653, 656, 22, 657, 345/667, 506, 530, 543, 549, 564–566, 571, 345/574, 204, 290; 382/162, 296, 276, 297, 382/300, 305; 348/560, 557, 567, 580, 583, 348/715, 582, 714

See application file for complete search history.

(56) References Cited

U.S. PATENT DOCUMENTS

| 5,633,952 | A | * | 5/1997 | Outa et al. ................. 382/165 |
| 2003/0039406 | A1 | * | 2/2003 | Chapin et al. ............... 382/296 |
| 2005/0275725 | A1 | * | 12/2005 | Olsson et al. .......... 348/207.99 |
| 2007/0011023 | A1 | * | 1/2007 | Silverbrook .................. 705/1 |

* cited by examiner

*Primary Examiner*—Wesner Sajous
(74) *Attorney, Agent, or Firm*—Ronald O. Neerings; Wade James Brady, III; Frederick J. Telecky, Jr.

(57) ABSTRACT

In a method and system for controlling rotation of a color image stored as sub-sampled image data in a memory, a controller includes a finite state machine (FSM) operable to fetch the sub-sampled image data and provide the sub-sampled data as a plurality of pixels to form the color image having a predefined angle of rotation. The FSM provides a predefined address of sub-sampled image data describing the color image stored in the memory to an addressing unit. The addressing unit is operable to read twice the sub-sampled image data located at the predefined address. A memory device is operable to push each read instance of the sub-sampled image data. A pipeline controlled by the FSM is operable to pull and selectively read the sub-sampled image data from the memory device for generating the plurality of pixels.

20 Claims, 3 Drawing Sheets

FIG. 3

COMBINATORIAL LOGIC 300 modify_for_rotation: PROCESS (fifo_data_endian_converted, count_y_q, vid_csc_rotation, count_x_q, slaveport_csc_width_memory, slaveport_row_repeat_en, dig_fid, channel_mapping)
BEGIN --If rotation of 90 or 270 degrees, we need to swap the Y1 and Y0 if on odd/even rows, or based on the fid if the DMA is
-- skipping rows in memory
--If rotation of 180, always swap Y positions 310                          320                        330

IF ( (vid_csc_rotation = "01" AND ( (count_y_q(0) = '1' AND channel_mapping = '0') OR
                (dig_fid = '1' AND channel_mapping = '1'))) OR
   (vid_csc_rotation = "11" AND ( ( count_y_q(0) = '0' AND channel_mapping = '0') OR
                (dig_fid='0' AND channel_mapping = '1') )) OR
   (vid_csc_rotation = "10" ) ) THEN rot_fifo_data_endian_converted(31 downto 24) <= fifo_data_endian_converted(15 downto 8);
    rot_fifo_data_endian_converted(23 downto 16) <= fifo_data_endian_converted(23 downto 16);
    rot_fifo_data_endian_converted(15 downto 8) <= fifo_data_endian_converted(31 downto 24);
    rot_fifo_data_endian_converted(7 downto 0) <= fifo_data_endian_converted(7 downto 0);

ELSE rot_fifo_data_endian_converted <= fifo_data_endian_converted;

END IF;
END PROCESS modify_for_rotation;

TWO DIMENSIONAL ROTATION OF SUB-SAMPLED COLOR SPACE IMAGES

BACKGROUND

The present disclosure relates generally to color digital image processing, and more particularly to an improved system and method for display rotation.

It is well known that different color spaces such as a red, green, blue (RGB) primary color model, may be used to represent, process and/or describe color. Similar to the RGB primary color model, YUV is a well known and widely used color model for describing color space (or color information) in terms of luminance (Y) component that is indicative of the brightness and chrominance (U and V) components that are indicative of the color. The human eye is less sensitive to color variations than to intensity variations. The YUV format allows the encoding of luminance (Y) information at full bandwidth/resolution and chrominance (UV) information at reduced bandwidth/resolution. The YUV format, which was originally developed for backward compatibility with black and white television, uses a matrixed combination of RGB to reduce the amount of information in the signal for conserving bandwidth.

Chroma sub-sampling, which is a well known sampling technique, generally refers to the use of lower resolution (fewer bits) for digitally sampling the chrominance (U and V) information in an image compared to the luminance (Y) information. The chroma sub-sampling is usually expressed as a three part ratio of the number of luminance (Y) samples, followed by the number of samples of the chrominance (U and V) components for each sampled area of the image. For example, a YUV 4:2:2 samples the two color-difference components (U and V) at half the sample rate of the brightness (Y) component, thereby utilizing less memory and less bandwidth compared to a YUV 4:4:4 sample.

Pixel data associated with a digital image may be typically stored in memory. The digital image may be retrieved from the memory and displayed as a two dimensional display on an image output device, such as a display device, a printer device and similar others. The display device may include a liquid crystal display (LCD), a plasma display, a television (TV), a projector display and similar others. A user viewing the display may desire to rotate the display for optimized viewing, e.g., change from a portrait display orientation to a landscape display orientation. Traditional techniques for rotating the display may include use of software, which may be slow in terms of desired performance. Some techniques may use additional main memory as a temporary memory area for copying the image data into the temporary memory and then manipulating the copied image data for rotation. However, such techniques may be less efficient and costly due to the need for performing additional reads and writes on the image data to perform the rotation.

SUMMARY

Applicants recognize an existing need for an improved method and system for rotating two dimensional color images stored in a memory as sub-sampled data, the improved method and system providing an improved performance, efficiency and cost. In addition, the applicants recognize the advantage of providing the flexibility to display the automatic rotation of color images on a variety of display devices such as liquid crystal displays (LCD) displays and television (TV) display screens, absent the disadvantages found in the prior techniques discussed above.

The foregoing need is addressed by the teachings of the present disclosure, which relates to an improved method and system for rotating two dimensional color images stored in a memory as sub-sampled data. According to one embodiment, in a method and system for controlling rotation of a color image stored as sub-sampled image data in a memory, a controller includes a finite state machine (FSM) operable to fetch the sub-sampled image data and provide the sub-sampled data as a plurality of pixels to form the color image having a predefined angle of rotation. The FSM provides a predefined address of sub-sampled image data describing the color image stored in the memory to an addressing unit. The addressing unit is operable to read twice the sub-sampled image data located at the predefined address. A memory device is operable to push each read instance of the sub-sampled image data. A pipeline controlled by the FSM is operable to pull and selectively read the sub-sampled image data from the memory device for generating the plurality of pixels.

In one aspect of the disclosure, a method for rotating a color image stored in a memory as sub-sampled data includes reading sub-sampled image data describing the color image. The sub-sampled image data is located at a predefined address of the memory. The sub-sampled image data is pushed in a memory device. The same sub-sampled image data is re-read and pushed in the memory device, thereby generating substantially identical records in the memory device. A plurality of pixels is generated by selectively reading the sub-sampled image data, including the substantially identical records. The plurality of pixels form the color image having a predefined angle of rotation.

Several advantages are achieved by the method and system for two dimensional rotation of color images stored as sub-sampled data according to the illustrative embodiments presented herein. The embodiments advantageously provide a controller to automatically control rotation of a color image stored as sub-sampled image data in a memory. The improved rotation technique advantageously provides reading of the sub-sampled data twice to generate pixels forming the rotated color image in real time, thereby providing improved performance, efficiency and cost. This advantageously enables manufacturers of display systems to improve user experience.

BRIEF DESCRIPTION OF THE DRAWINGS

FIG. 3 illustrates combinatorial logic executed by a finite state machine (FSM) to control a pipeline described with reference to FIG. 2, according to an embodiment.

DETAILED DESCRIPTION

Figure 1:
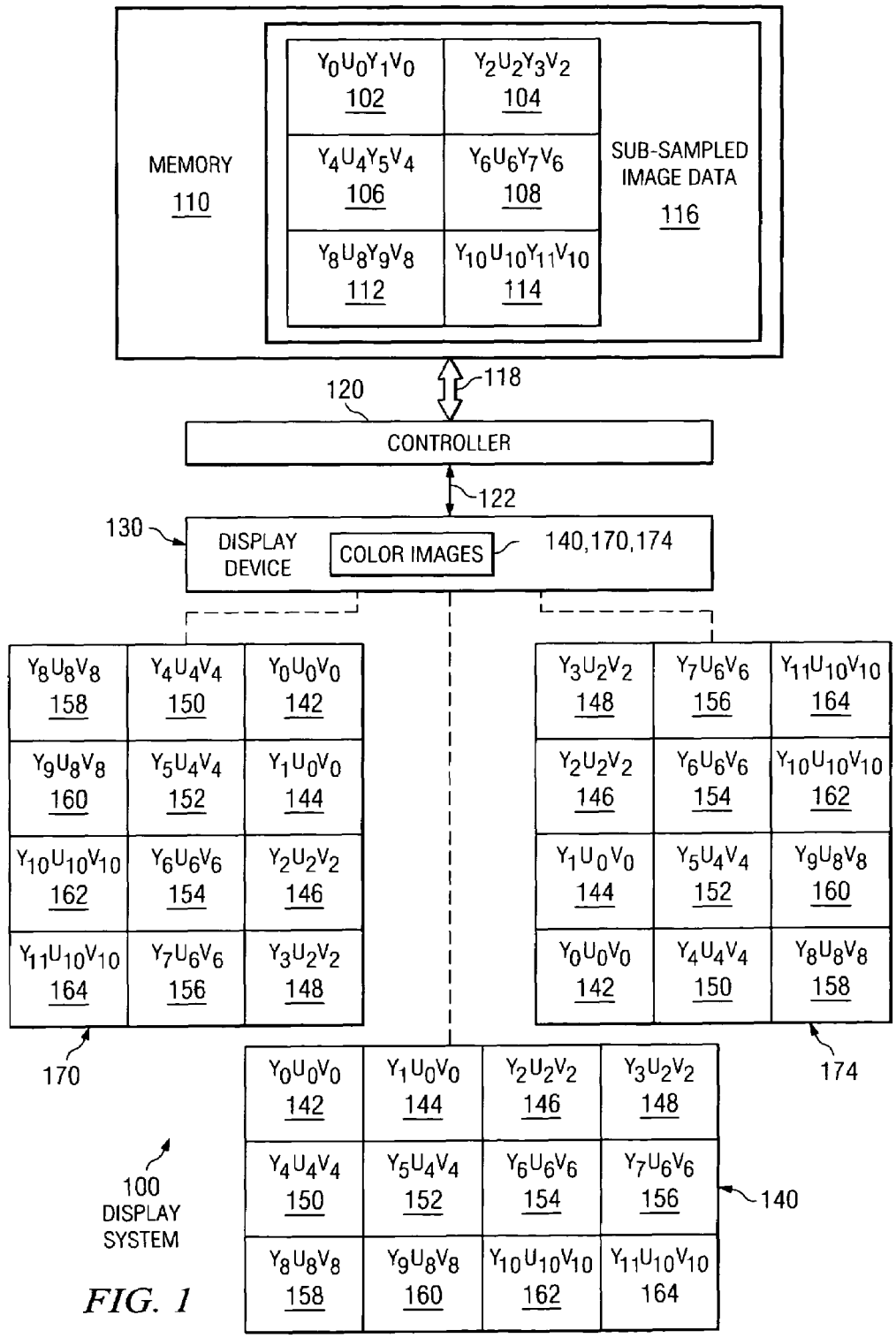
FIG. 1 illustrates a block diagram of a display system, according to an embodiment.

Novel features that may be considered characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

Many traditional display rotation techniques often deploy software, which may be slow in terms of desired performance. Some techniques may use additional main memory to copy and subsequently manipulate color image data for the rotation, thereby requiring additional read/write operation and additional memory cost. These problems may be addressed by an improved system and method for rotating two dimensional color images stored in a memory as sub-sampled data. In an improved method and system for rotating two dimensional color images stored in a memory as sub-sampled data, the memory data is selectively read twice for each column, pushed in a memory device, pulled from the memory device and selectively read to generate the rotated color image displayable on a LCD and/or a TV display.

According to one embodiment, in a method and system for controlling rotation of a color image stored as sub-sampled image data in a memory, a controller includes a finite state machine (FSM) operable to fetch the sub-sampled image data and provide the sub-sampled data as a plurality of pixels to form the color image having a predefined angle of rotation. The FSM provides a predefined address of sub-sampled image data describing the color image stored in the memory to an addressing unit. The addressing unit is operable to read twice the sub-sampled image data located at the predefined address. A memory device is operable to push each read instance of the sub-sampled image data. A pipeline controlled by the FSM is operable to pull and selectively read the sub-sampled image data from the memory device for generating the plurality of pixels.

The following terminology may be useful in understanding the present disclosure. It is to be understood that the terminology described herein is for the purpose of description and should not be regarded as limiting.

YUV—is a well known color model for describing color space (or color information) in terms of luminance (Y) component that is indicative of the brightness and chrominance (U and V) components that are indicative of the color.

Chrominance (U and V) sub-sampling—is a well known sampling technique and generally refers to the use of lower resolution (e.g., fewer bits) for digitally sampling the chrominance (U and V) information in a color image compared to the luminance (Y) information. The chrominance sub-sampling is usually expressed as a three part ratio of the number of luminance (Y) samples, followed by the number of samples of the chrominance (U and V) components for each sampled area of the image, e.g., for each pixel of the color image. For example, a YUV 4:2:2 samples the two color-difference components (U and V) at half the sample rate of the brightness (Y) component, thereby utilizing less memory and less bandwidth compared to a YUV 4:4:4 sample. The YUV color space may be typically encoded using 8 bits per pixel for Y and, effectively 4 bits per pixel for U and V (to reflect the 4:2:2 sampling), for a total of 16 bits (2 bytes) per pixel instead of 24 bits per pixel for the YUV 4:4:4 sampling. Thus, YUV 4:2:2 sub-sampled data for two adjacent pixels may be stored in 32 bits of memory. The luminance (Y) is often described as an independent component and the chrominance (U and V) is described as a shared component between the adjacent pixels. The color image may be reconstructed for display from the YUV 4:2:2 sub-sampled image data stored in the memory. It should be emphasized that, while processing sub-sampled data stored in memory, individual samples in the sub-sampled data may no longer apply only to single pixels, but includes information shared between several pixels.

Device—Any electronic machine or component that is operable to perform at least one predefined function. Examples of electronic devices may include power supplies, digital signal processors, flip flops, controllers, memory chips, displays, processors, and communication interfaces. Many devices may require a software program to interact between a user and the device and/or between devices.

System—One or more interdependent devices that co-operate to perform one or more predefined functions.

Configuration—Describes a set up of a device and/or a system and refers to a process for setting, defining, or selecting hardware and/or software properties, parameters, or attributes of the device and/or the system.

FIG. 1 illustrates a block diagram of a display system 100, according to an embodiment. In the depicted embodiment, the display system 100 includes a memory 110, a controller 120 and a display device 130. The controller 120 is operable to read data describing a color image 140 with no rotation stored in the memory 110 and at the same time automatically and dynamically perform display rotation having a predefined angle of rotation. The controller 120 generates rotated color images 170 and 174 for display on the display device 130 via a display link 122. Additional details of the controller 120 are described with reference to FIG. 2. In a particular embodiment, the controller 120 is implemented by using a microprocessor or a digital signal processor (DSP). In an embodiment, the controller 120 may be included in one of a microprocessor, a digital signal processor (DSP), a radio frequency (RF) chip, and a microcontroller.

In a particular embodiment, the controller 120 is coupled to the memory 110 via a direct memory access (DMA) channel 118 to facilitate a high data transfer rate. The memory 110 stores color image data. In a particular embodiment, the memory 110 stores sub-sampled image data 116, e.g., YUV 4:2:2 sub-sampled data, describing the color image. For example, as described earlier, 32 bits of the memory 110 may be used to save two 16 bit YUV 4:2:2 samples describing two adjacent pixels of a plurality of pixels forming the color image 140.

In the depicted embodiment, the color image 140 is formed by 4×3 pixels shown as $Y_0U_0V_0$ 142, $Y_1U_0V_0$ 144, $Y_2U_2V_2$ 146, $Y_3U_2V_2$ 148, $Y_4U_4V_4$ 150, $Y_5U_4V_4$ 152, $Y_6U_6V_6$ 154, $Y_7U_6V_6$ 156, $Y_8U_8V_8$ 158, $Y_9U_8V_8$ 160, $Y_{10}U_{10}V_{10}$ 162, and $Y_{11}U_{10}V_{10}$ 164. In this embodiment, the initial angle shown is 0 degrees, e.g., indicative of no rotation. A clockwise 90 degree rotated color image 170 is formed by rotating the 4×3 pixels of the color image 140 to form 3×4 pixels of the rotated color image 170. The rotated color image 170 is shown as $Y_8U_8V_8$ 158, $Y_4U_4V_4$ 150, $Y_0U_0V_0$ 142, $Y_9U_8V_8$ 160, $Y_5U_4V_4$ 152, $Y_1U_0V_0$ 144, $Y_{10}U_{10}V_{10}$ 162, $Y_6U_6V_6$ 154, $Y_2U_2V_2$ 146, $Y_{11}U_{10}V_{10}$ 164, $Y_7U_6V_6$ 156 and $Y_3U_2V_2$ 148.

Although a 90 degree angle of rotation is described, the predefined angle of rotation is selectable to be any one of 90 degrees and 270 degrees relative to an initial angle such as 0 degrees. A 3×4 pixel 270 degree rotated color image 174 is shown as $Y_3U_2V_2$ 148, $Y_7U_6V_6$ 156, $Y_{11}U_{10}V_{10}$ 164, $Y_2U_2V_2$ 146, $Y_6U_6V_6$ 154, $Y_{10}U_{10}V_{10}$ 162, $Y_1U_0V_0$ 144, $Y_5U_4V_4$ 152, $Y_9U_8V_8$ 160, $Y_0U_0V_0$ 142, $Y_4U_4V_4$ 150 and $Y_8U_8V_8$ 158.

In the depicted embodiment, the memory 110 stores the YUV 4:2:2 sub-sampled data 116 shown as $Y_0U_0Y_1V_0$ 102, $Y_2U_2Y_3V_2$ 104, $Y_4U_4Y_5V_4$ 106, $Y_6U_6Y_7V_6$ 108, $Y_8U_8Y_9V_8$ 112, and $Y_{10}U_{10}Y_{11}V_{10}$ 114 describing the color image 140. Thus, 32 bits of sub-sampled data $Y_0U_0Y_1V_0$ 102 is used to generate the adjacently located 16-bit pixels $Y_0U_0V_0$ 142 and $Y_1U_0V_0$ 144 of the color image 140. The memory 110 is shown as a memory array having m rows and n columns, where m=3 and n=2. The rotated color image 170 is generated from the same YUV 4:2:2 sub-sampled data.

In an exemplary non-depicted embodiment, the display device 130 is a liquid color display (LCD) display. In this embodiment, the plurality of pixels are displayed on the LCD display in a non-interlaced manner. In an exemplary non-depicted embodiment, the display device 130 is a television (TV) display. In this embodiment, the plurality of pixels are displayed on the TV display in an interlaced manner.

In an exemplary non-depicted embodiment, the display system 100 may be included as a part of a computer system. It should be understood that the term "computer system" is intended to encompass any device having a processor that executes instructions from a memory medium.

Figure 2:
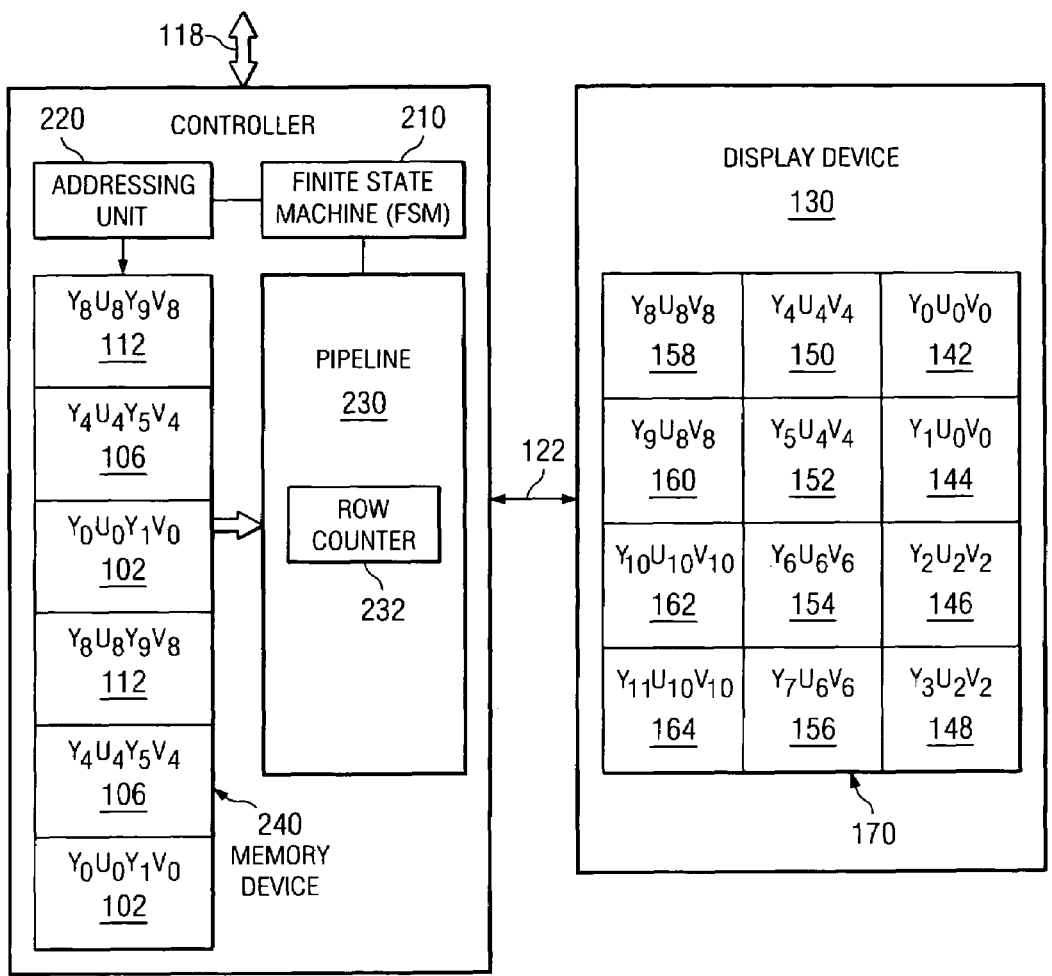
FIG. 2 is a block diagram illustrating additional details of a controller described with reference to FIG. 1, according to an embodiment.

FIG. 2 is a block diagram illustrating additional details of the controller 120 described with reference to FIG. 1, according to an embodiment. In the depicted embodiment, the controller 120 includes at least one finite state machine (FSM) 210 for controlling various states and operations such as acquire data and rotate display. In an exemplary, non-depicted embodiment, each state may have a dedicated FSM.

The FSM 210 may be implemented as a digital circuit operable to execute combinatorial logic. The FSM 210 may include electronic devices such as field programmable gate arrays (FPGA's), a programmable logic device, logic gates and/or flip flops.

In the depicted embodiment, the FSM 210 controls the operation of a addressing unit 220 and a pipeline 230. In a particular embodiment, the FSM 210 controls the operation of the addressing unit 220 by providing a predefined starting address the number of rows of the memory 110 for a read operation. The predefined address may be defined as a function of the predefined angle of rotation. The FSM 210 may also provide the addressing unit 220 with an addressing mode, a pixel offset and a row offset. The addressing mode may be configured to be one of a linear addressing mode, a single offset addressing mode and a double offset addressing mode.

In a particular embodiment, the addressing unit 220 is operable to read the sub-sampled image data 116 such as $Y_0U_0Y_1V_0$ 102, $Y_2U_2Y_3V_2$ 104, $Y_4U_4Y_5V_4$ 106, $Y_6U_6Y_7V_6$ 108, $Y_8U_8Y_9V_8$ 112, and $Y_{10}U_{10}Y_{11}V_{10}$ 114 twice. That is, the addressing unit 220 is operable to read the predefined memory locations such as a column twice, as directed by the FSM 210. In a particular embodiment, the twice read data is pushed into a memory device 240 after each read operation. The memory device 240 is a first in first out (FIFO) device having a predefined depth. The size of the memory device 240 is substantially less than the size of the memory 110 to advantageously reduce cost. In a particular embodiment, the size of the memory device 240 is 1024 bytes compared to mega bytes for the memory 110. In the depicted embodiment, the twice read sub-sampled data $Y_8U_8Y_9V_8$ 112, $Y_4U_4Y_5V_4$ 106, $Y_0U_0Y_1V_0$ 102 is stored/pushed twice in the memory device 240.

In the depicted embodiment, the pipeline 230 is controlled by the FSM 210 to pull the twice sub-sampled image data from the memory device 240 for generating the plurality of pixels $Y_8U_8V_8$ 158, $Y_4U_4V_4$ 150, $Y_0U_0V_0$ 142, $Y_9U_8V_8$ 160, $Y_5U_4V_4$ 152, $Y_1U_0V_0$ 144, $Y_{10}U_{10}V_{10}$ 162, $Y_6U_6V_6$ 154, $Y_2U_2V_2$ 146, $Y_{11}U_{10}V_{10}$ 164, $Y_7U_6V_6$ 156 and $Y_3U_2V_2$ 148 to form the rotated color image 170. Additional details of combinatorial logic executed by the FSM 210 to control the pipeline 230 are described with reference to FIG. 3.

In a particular embodiment, the plurality of pixels are output by rows during each pass. In the depicted embodiment, the pipeline 230 includes a row counter 232 for the rows. In a particular embodiment, the row counter 232 may be set to an odd or even value depending on an odd or even row being output. Each pixel of the rotated color image 170 is generated by selectively reading an independent component (Y) and a shared component (U and V) stored in each row of the memory device 240 in response to the row counter. For example, a first independent component $Y_8$ and a first shared component $U_8V_8$ are selectively read from the memory device 240 to generate the first pixel $Y_8U_8Y_9V_8$ 112 of the first row (odd row). A second independent component $Y_9$ and the first shared component $U_8V_8$ are selectively read from the memory device 240 to generate the fourth pixel $Y_9U_8V_8$ 160 of the second row (even row). In a particular embodiment, the plurality of pixels corresponding to each odd or even row identified by the row counter are provided in accordance with the interleaving and non-interleaving format for the TV display and the LCD display.

In a particular embodiment, the addressing unit 220 operates asynchronously with the pipeline 230. That is, reading of the sub-sampled data from the memory 110 may occur asynchronously with the pipeline 230 generating the plurality of pixels. In another embodiment, the operation of the addressing unit 220 and the pipeline 230 may be synchronous.

FIG. 3 illustrates combinatorial logic 300 executed by the FSM 210 to control the pipeline 230 as described with reference to FIG. 2, according to an embodiment. The exemplary combinatorial logic 300 repositions the independent component (Y) to generate each pixel included in a display. For example, the first and second independent components, e.g., $Y_8$ and $Y_9$ of $Y_8U_8Y_9V_8$ 112 are swapped depending on odd or even row. A VID_CSC_ROTATION 310 indicates the predefined angle of rotation. For example a 00 is no rotation, 01 is 90 degree rotation and 11 is 270 degree rotation. A Count_y_q(0) 320 is the bottom bit of the row counter 232. If the bit is 0 then the row is an even row, if 1 then the row is an odd row. A channel_mapping 330 indicator is used to indicate a type of the display device 130. A '0' indicated an LCD display and a '1' indicates TV display. A dig_fid 340 having a '0' indicates even field, and '1' indicates odd field, which may be used for TV interlacing.

Figure 4:
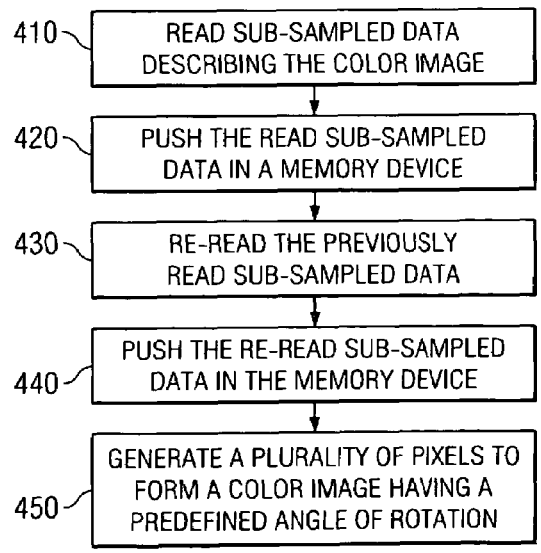
FIG. 4 is a flow chart illustrating a method for rotating a color image stored in a memory, according to an embodiment.

FIG. 4 is a flow chart illustrating a method for rotating a color image stored in a memory, according to an embodiment. In a particular embodiment, the color image is the color image 140 stored in the memory 110 described with reference to FIG. 1. At step 410, a sub-sampled image data, e.g., the sub-sampled image data 116, describing the color image is read. The sub-sampled image data is located at a predefined address of the memory 110. At step 420, the sub-sampled image data that is read is pushed into a memory device, e.g., the memory device 240. At step 430, the sub-sampled image data that was read at step 410 is re-read. At step 440, the sub-sampled image data that is re-read is pushed into the memory device 240, thereby saving the same sub-sampled image data twice. At step 450, a plurality of pixels are generated to form a rotated color image, e.g., the rotated color image 170, having a predefined angle of rotation. The plurality of pixels are formed by selectively reading the sub-sampled image data from the memory device 240. In a particular embodiment, the plurality of pixels are output by rows during each pass. The selective reading includes reading a first independent component corresponding to an even row and reading a second independent component corresponding to an odd row.

Various steps described above may be added, omitted, combined, altered, or performed in different orders. For example, the sub-sampled image data may be read twice at step 410 and pushed twice at step 420, thereby eliminating steps 430 and 440.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, although the disclosure is described in the context of rotating color images, this disclosure is not limited to use with display systems; rather, it envisions use of rotation of color images for all output devices including color printers. As an additional example, although the disclosure is described in the context of a single finite state machine (FSM), the controller may be implemented by deploying additional FSM's, with each FSM being dedicated to a particular function. As yet another example, although the disclosure is described in the context of YUV sub-sampled data, this disclosure is not limited to use with display systems incorporating YUV sub-sampling; rather it envisions any color space which may be sub-sampled.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A controller for rotating a color image stored in a memory as sub-sampled image data, the controller comprising:
    an addressing unit operable to read twice the sub-sampled image data located at a predefined address describing the color image stored in the memory;
    a memory device operable to push each read instance of the sub-sampled image data;
    a pipeline operable to pull the sub-sampled image data from the memory device for generating a plurality of pixels, wherein the plurality of pixels form the color image having a predefined angle of rotation.

2. The controller of claim 1, wherein a finite state machine (FSM) controls the addressing unit and the pipeline, wherein the FSM provides the predefined address, wherein the FSM is configured to define the predefined address as a function of the predefined angle of rotation.

3. The controller of claim 2, wherein the FSM is configurable to provide an addressing mode, a pixel offset and a row offset to the addressing unit.

4. The controller of claim 2, wherein the FSM is a digital circuit operable to execute combinatorial logic.

5. The controller of claim 1, wherein the predefined angle of rotation is selectable to be at least one of 90 degrees and 270 degrees relative to an initial angle.

6. The controller of claim 1, wherein an addressing mode of the addressing unit is configured to be one of a linear addressing mode, a single offset addressing mode and a double offset addressing mode.

7. The controller of claim 1, wherein the plurality of pixels are output by rows during each pass, wherein the pipeline includes a row counter for the rows, wherein each pixel is generated by selectively reading an independent component and a shared component stored in each row of the memory device in response to the row counter.

8. The controller of claim 7, wherein the selective reading includes reading a first independent component corresponding to an even row of the row counter and reading a second independent component corresponding to an odd row of the row counter, wherein the first independent component and the second independent component are respectively pulled from identical rows pushed separately in the memory device.

9. The controller of claim 7, wherein the plurality of pixels are provided to a display device, wherein the display device is selectable to be at least one of a liquid crystal display (LCD) and a television (TV) display.

10. The controller of claim 1, wherein the read twice of the sub-sampled data includes reading twice each column of the memory starting at the predefined address.

11. The controller of claim 1, wherein the sub-sampled image data is stored in a predefined format having an independent component and a shared component between adjacent pixels.

12. The controller of claim 1, wherein the memory device is a first in first out (FIFO) device.

13. The controller of claim 1, wherein the controller is included in one of a microprocessor, a digital signal processor, a radio frequency chip, and a microcontroller.

14. A method for rotating a color image stored in a memory, the method comprising:
    reading sub-sampled image data describing the color image, wherein the sub-sampled image data is located at a predefined address of the memory;
    pushing the sub-sampled image data in a memory device;
    re-reading the sub-sampled image data;
    pushing the sub-sampled image data that is re-read in the memory device; and
    generating a plurality of pixels, wherein the plurality of pixels form the color image having a predefined angle of rotation, wherein the plurality of pixels are formed by selectively reading the sub-sampled image data.

15. The method of claim 14, wherein the plurality of pixels are output by rows during each pass, wherein a row counter counts the rows, wherein each pixel is generated by selectively reading an independent component and a shared component stored in each row of the memory device, wherein the independent component is selected in response to the row counter.

16. The method of claim 15, wherein the selective reading includes reading a first independent component corresponding to an even row of the row counter and reading a second independent component corresponding to an odd row of the row counter, wherein the first independent component and the second independent component are respectively pulled from identical rows pushed separately in the memory device.

17. A display system for rotating a color image, the display system comprising:
    a memory for storing the color image as sub-sampled image data;

a controller coupled to the memory, wherein the controller includes combinatorial logic to convert the sub-sampled image data into a plurality of pixels, wherein the plurality of pixels form the color image having a predefined angle of rotation, wherein the combinatorial logic is executable for:
   reading sub-sampled image data describing the color image, wherein the sub-sampled image data is located at a predefined address of the memory;
   pushing the sub-sampled image data in a memory device;
   re-reading the sub-sampled image data;
   pushing the sub-sampled image data that is re-read in the memory device;
   generating the plurality of pixels, wherein the plurality of pixels are formed by selectively reading the sub-sampled image data; and
a display device coupled to the controller for displaying the plurality of pixels.

18. The display system of claim 17, wherein the controller is included in one of a microprocessor, a digital signal processor, a radio frequency chip and a microcontroller.

19. The display system of claim 17, wherein the plurality of pixels are output by rows during each pass, wherein a row counter counts the rows, wherein each pixel is generated by selectively reading an independent component and a shared component stored in each row of the memory device, wherein the independent component is selected in response to the row counter.

20. The test system of claim 19, wherein the selective reading includes reading a first independent component corresponding to an even row of the row counter and reading a second independent component corresponding to an odd row of the row counter, wherein the first independent component and the second independent component are respectively pulled from identical rows pushed separately in the memory device.

* * * * *